United States Patent Office 3,658,760
Patented Apr. 25, 1972

3,658,760
MANUFACTURE OF POLYMERS
Lambert Gaston Jeurissen, Mortsel, and André Jan Conix, Antwerp, Belgium, assignors to Gevaert-Agfa N.V., Mortsel, Belgium
No Drawing. Continuation-in-part of application Ser. No. 533,265, Mar. 10, 1966. This application May 26, 1969, Ser. No. 828,007
Claims priority, application Great Britain, Mar. 11, 1965, 10,408/65
Int. Cl. C08g 17/013
U.S. Cl. 260—75 R
9 Claims

ABSTRACT OF THE DISCLOSURE

Highly polymeric film forming polyesters are obtained from an aromatic dicarboxylic acid or an ester-forming derivative thereof and a glycol by (I) forming a glycol dicarboxylate from the above-mentioned starting materials, and (II) polycondensing the glycol dicarboxylate in the presence of a catalytic amount of a titanium compound of the formula $TiR_nX_{4-n}$, wherein the R's represent the same or different carbon-linked, aliphatic, aromatic, or cycloaliphatic radicals, the X's represent the same or different hydroxy, acyloxy, halide, cyanide, cyanate, thiocyanate, alkoxy, aryloxy, thioalkoxy, and thioaryloxy radicals, and $n$ is 1, 2 or 3.

---

This application is a continuation-in-part of application Ser. No. 533,265, filed Mar. 10, 1966 now abandoned.

This invention relates to improvements in the manufacture of polyesters, and in particular highly polymeric polyethylene terephthalate.

Highly polymeric polyethylene terephthalate has great value as a fibre and film-forming material. In general it is made by an ester-interchange reaction between an ester of terephthalic acid and ethylene glycol whereby bis(betahydroxyethyl) terephthalate is formed. This compound is then poly-condensed under reduced pressure and at high temperature.

The prior art contains a large number of disclosures directed to the use of catalysts in the manufacture of fibre and film-forming linear condensation-type polyesters. Among numerous useful catalysts for preparing polyesters are zinc acetate, antimony trioxide, titanium compounds such as titanium tetrafluoride, titanium dioxide, alkyl and aryl titanates, titanium tetrachloride, titanium dichloride, titanium diacetate and compounds of other metals.

According to the present invention an improved process is provided for the manufacture of highly polymeric polyesters obtained by reacting a glycol with an aromatic dicarboxylic acid or an ester-forming derivative thereof and polycondensing the resulting glycol dicarboxylate, characterised in that at least during the polycondensation step an organometallic titanium compound is present, which is soluble in the reaction mixture and possesses the formula $TiR_nX_{4-n}$, wherein R represents the same or different aliphatic, aromatic, or cycloaliphatic radicals which are bound to the titanium atom through carbon atoms; X represents the same or different radicals taken from the group consisting of hydroxy groups, acyloxy groups, halogen atoms, cyanide groups, cyanate groups, thiocyanate groups, alkoxy groups, aryloxy groups, thioalkoxy groups and thioaryloxy groups, and $n$ is 1, 2 or 3. Preferably, R is an alkyl group having from 1 to 7 carbon atoms, i.e., methyl, ethyl, isopropyl, butyl, amyl, hexyl, and heptyl; mono-nuclear or di-nuclear aryl or substituted aryl such as phenyl, chloro-phenyl, naphthyl, tolyl and anisyl, and cycloaliphatic such as cyclopentadienyl and indenyl; X is hydroxy, a halogen, i.e., fluorine, chlorine, bromine, and iodine, a lower-alkoxy such as isopropoxy, butoxy, pentoxy, an acyloxy group, i.e. an acetate group including hydroxyacetate, chloroacetate, di-chloroacetate, tri-chloroacetate, and mercaptoacetate, and $n$ again is 1, 2 or 3. These orgnometallic titanium compounds are useful for the catalysis of both ester-interchange and polycondensation reactions.

If preferred, other ester-interchange catalysts such as zinc acetate, or a mixture of such substances may be used as the ester-interchange catalyst, with the organometallic titanium compounds of the invention being used only as the polycondensation catalysts. Alternatively the organometallic titanium compounds may be used as catalysts, especially in the polycondensation step, together with other known polycondensation catalysts or mixtures thereof.

Various organometallic titanium compounds having the formula $TiR_nX_{4-n}$ which can be employed as catalyst in accordance with the present invention are described in the prior art as follows:

TABLE I (1) Cotton: Progress in Inorganic Chemistry, Interscience Publishers Inc., vol. 1 (1959), p. 1 et seq.
(2) British Pat. No. 793,354, Apr. 16, 1958 (Chem. Abstr. 53 (1956), 1,148)
(3) Belgian Pat. No. 559,046, July 31, 1957 (Chem. Abstr. 53 (1959), 23,093–94)
(4) British Pat. No. 779,490, July 24, 1957 (Chem. Abstr. 51 (1957), 17,992)
(5) U.S. Pat. No. 2,886,579, May 12, 1959 (Chem. Abstr. 53 (1959), 17,057)
(6) British Pat. No. 858,930, Jan. 18, 1961 (Chem. Abstr. 55 (1961), 16,565)
(7) British Pat. No. 798,001, July 9, 1958 (Chem. Abstr. 53 (1959), 2,250)
(8) British Patent No. 785,760, Nov. 6, 1957 (Chem. Abstr. 52 (1958), 11,126)
(9) German Pat. No. 1,100,022, Feb. 23, 1961 (Chem. Abstr. 55 (1961), 25,757)
(10) British Pat. No. 793,355, Apr. 16, 1958 (Chem. Abstr. 53 (1959), 1,148)
(11) J. Am. Chem. Soc. 76, 4281–4 (1954) (Chem. Abstr. 50 (1956) 974–75)

Specific classes of compounds and representative compounds under these classes which can be employed as catalysts according to this invention and falling within the generic formula $TiR_nX_{4-n}$ are Titanocene dihalides [titanocene is a di(cyclopentadienyl) titanium compound in accordance with the naming system of M. D. Rausch in Canadian Journal of Chemistry, 41, 1,289 (1963)]

titanocene difluoride [8] [10] [11]
titanocene dichloride [7] [8] [10] [11]
titanocene dibromide [2] [10] [11]
titanocene diiodide [10] [11]
Titanocene hydroxyhalides
    titanocene hydroxybromide [11]
Titanocene diacetates
    titanocene diacetate [6]
    titanocene di(chloroacetate) [6]
    titanocene di(dichloroacetate) [6]
    titanocene di(trichloroacetate) [6]
    titanocene di(hydroxyacetate) [6]
    titanocene di(mercaptoacetate) [6]
Cyclopentadienyl titanium trihalides
    cyclopentadienyl titanium trichloride [2]
Cyclopentadienyl dialkoxytitanium halides
    cyclopentadienyl dibutoxytitanium chloride [6] [7]
    cyclopentadienyl dibutoxytitanium bromide [2]
Cyclopentadienyl dialkoxytitanium acetates
    cyclopentadienyl dibutoxytitanium trichloroacetate [6]

Indenyl dialkoxytitanium halides
 indenyl dibutoxytitanium bromide [2]
Indenyl trialkoxytitanium compounds
 indenyl tributoxytitanium [4]
Di-indenyltitanium dihalides
 di-indenyl titanium dichloride [6]
Di-indenyltitanium acetates
 di-indenyltitanium trichloroacetate [6]
Aryl trialkoxytitanium compounds
 phenyl triisopropoxytitanium [3] [4] [5]
 α-naphthyl tributoxytitanium [4] [5]
 p-tolyl tributoxytitanium [5]
 p-anisyl tributoxytitanium [5]
Diaryl dialkoxytitanium compounds
 diphenyl dibutoxy titanium [3]
Alkyl trialkoxytitanium compounds
 isopropyltributoxy titanium [3]
Alkyl titanium trihalides
 ethyl titanium trichloride [9]
Dialkyl titanium dihalides
 diethyl titanium dichloride [9]
 dimethyl titanium dichloride [3]

The compounds can be prepared as described in the reference of Table I corresponding to the numbers in the brackets.

The use of the organometallic titanium compounds as catalysts in the preparation of high molecular weight linear polyesters presents various improvements in comparison to the catalysts proposed in the prior art. Thus, very small amounts of the organometallic titanium compounds according to the invention suffice to effectively catalyze the ester-interchange and/or the polycondensation reaction. Since the coloration of the polyesters in general is dependent upon and proportional to the total amount of catalyst, the ability to use small amounts of the organometallic titanium catalyst provides polyesters of less coloration. Further, known catalysts, such as the antimony catalysts in general, give polyesters with relatively low melting points. Additionally, their catalytic action is relatively slow. The organometallic titanium compounds of the present invention, on the other hand, are much more active in catalyzing the ester-interchange and/or poly-condensation, and in the same period of time give polyesters with much higher melting points having a low diethylene glycol content and the films manufactured from the polyesters have a higher modulus of elasticity.

Although the novel catalysts are of special interest in the preparation of polyethylene terephthalate, the organometallic titanium compounds can, in general, be employed in the preparation of all polyesters involving an ester-interchange reaction between a di-carboxylic acid ester, for instance a pyridine dicarboxylic acid ester, or mixtures of different dicarboxylic acid esters and a glycol, mixtures of glycols, or other diols such as cyclohexane dimethanols, followed by polycondensation of the resulting glycol and/or diol dicarboxylates. The organometallic titanium compounds do not interfere with stabilizing agents such as the phosphates or phosphites which are commonly added to the polycondensation reaction mixture.

The following examples are cited to illustrate the invention. They are not intended to limit it in any way. The inherent viscosity $\eta_{inh}$ is determined at 25° C. at a concentration of 0.5 gram per 100 ccs. in a 60:40 mixture of phenol and sym.-tetrachloroethane. $\eta_{inh}$ is calculated from the equation $$\eta_{inh} = \frac{\ln \eta_{rel}}{c}$$

wherein $\eta_{rel}$ is the relative viscosity, which equals the ratio $$\frac{\text{flow time of solution}}{\text{flow time of solvent}}$$ and $c$ is the concentration (0.5)

The crystalline melting point is determined by heating a crystallized sample of polyester on the heating stage of a polarizing microscope. The temperature of the hot stage is raised at a rate of 0.8° C./min. The crystalline melting point is obtained by noting the temperature at which the last trace of birefringence disappears between the crossed nicols.

At the end of the polycondensation period the color of the molten polyester is visually compared with arbitrary color standards consisting of aqueous solutions of du Pont Pontamine Catechu 3G dye (C.I. 36,300) according to the following system of color ratings:

0=pure water.
1=0.00025 grams of the above dye dissolved in 100 ml. of water
2=twice as much dye as in 1
3=three times as much dye as in 1
4=four times as much dye as in 1
5=etc.

EXAMPLE 1

38.8 parts of dimethyl terephthalate (0.2 mole) and 27.3 parts of ethylene glycol (0.44 mole) are placed in a 25 mm. inside diameter glass polymerization tube, and 5.9 mg. of titanocene diacetate (1.10⁻⁴ mole/mole of dimethylterephthalate) are added. Titanocene diacetate is prepared as described in U.K. patent specification 858,930. The reactants are heated for 2½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while bubbling dry nitrogen through the melt. After 3 hours at 282° C., the vacuum is released and the polyethylene terephthalate polyester is obtained having an inherent viscosity $\eta_{inh}$ (c.=0.5)=0.62. The polyester is clear, has a light color number of 5, and melts at 265.5° C., which indicates a very low diethylene glycol content.

EXAMPLE 2

38.8 parts of dimethyl terephthalate (0.2 mole) and 27.3 parts of ethylene glycol (0.44 mole) are placed in a 25 mm. inside diameter glass polymerization tube, and 11.8 mg. of titanocene diacetate (2.10⁻⁴ mole/mole of dimethylterephthalate) are added. The reactants are heated for 2 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while bubbling dry nitrogen through the melt. After 3 hours at 282° C., vacuum is released and polyethylene terephthalate polyester is obtained having an inherent viscosity $\eta_{inh}$ (c.=0.5)=0.67. The polyester is clear, has a light color number of 7, and melts at 265° C., which indicates a very low diethylene glycol content.

EXAMPLE 3

38.8 parts of dimethyl terephthalate (0.2 mole) and 27.3 parts of ethylene glycol (0.44 mole) are placed in a 25 mm. inside diameter glass polymerization tube, and 9.9 mg. of titanocenedichloride (2.10⁻⁴ mole/mole of dimethyl terephthalate) are added. Titanocenedichloride is prepared as described in J. Am. Chem. Soc., 76, 4281 (1954). The reactants are heated for 2 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while bubbling dry nitrogen through the melt. After 3 hours at 282° C., vacuum is released and polyethylene terephthalate polyester is obtained having an inherent viscosity $\eta_{inh}$ (c.=0.5)=0.64. The polyester is clear, has a color number of 13, and melts at 265.5° C., which indicates a very low diethylene glycol content.

EXAMPLE 4

38.8 parts of dimethyl terephthalate (0.2 mole) and 27.3 parts of ethylene glycol (0.44 mole) are placed in a 25 mm. inside diameter glass polymerization tube, and 5 mg. of titanocenedichloride ($1.10^{-4}$ mole/mole of dimethyl terephthalate) are added. The reactants are heated for 2½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while bubbling dry nitrogen through the melt. After 3 hours at 282° C., vacuum is released and polyethylene terephthalate polyester is obtained having an inherent viscosity $\eta_{inh}$ (c.=0.5)=0.61. The polyester is clear, has a color number of 10, and melts at 264.5° C., which indicates a very low diethylene glycol content.

EXAMPLE 5

38.8 parts of dimethyl terephthalate (0.2 mole) and 27.3 parts of ethylene glycol (0.44 mole) are placed in a 25 mm. inside diameter glass polymerization tube, and 6.0 mg. of phenyl-tri(isopropoxy)-titanium ($1.10^{-4}$ mole/ mole of dimethyl terephthalate) are added. Phenyl-tri(isopropoxy)-titanium is prepared as described in J. Am. Chem. Soc. 75, 3880 (1953). The reactants are heated for 2½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while bubbling dry nitrogen through the melt. After 3 hours at 282° C., vacuum is released and polyethylene terephthalate polyester is obtained having a viscosity $\eta_{inh}$ (c.=0.5)=0.60. The polyester is clear, has a light color number of 6, and melts at 265° C., which indicates a very low diethylene glycol content.

EXAMPLE 6

38.8 parts of dimethyl terephthalate (0.2 mole) and 27.3 parts of ethylene glycol (0.44 mole) are placed in a 25 mm. inside diameter glass polymerization tube, and 12.1 mg. of phenyl-tri(isopropoxy)-titanium ($2.10^{-4}$ mole/mole of dimethyl terephthalate) are added. The reactants are heated for 2 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while bubbling dry nitrogen through the melt. After 3 hours at 282° C., vacuum is released and polyethylene terephthalate polyester is obtained having an inherent viscosity $\eta_{inh}$ (c.=0.5)=0.63. The polyester is clear, has a light color number of 8, and melts at 264° C., which indicates a very low diethylene glycol content.

EXAMPLE 7

38.8 parts of dimethyl terephthalate (2 mole) and 27.5 parts of ethylene glycol are placed in a stainless steel autoclave equipped with a stirrer, a gas inlet tube and a rectifying column. After adding 75 mg. of titanocene diacetate, the mixture is stirred and heated for 3 hours at 197° C. at atmospheric pressure, while a continuous stream of dry nitrogen is introduced. The ester-interchange being finished, the temperature is gradually raised over 1 hour to 282° C. and the unreacted ethylene glycol distilled off. The pressure is reduced to 0.1 to 0.3 mm. of Hg. After 3 hours at 282° C., vacuum is released and polyethylene terephthalate polyester is obtained having an inherent viscosity $\eta_{inh}$ (c.=0.5)=0.70. The polyester is clear and has a low color number of 6.

EXAMPLE 8

38.8 parts of dimethyl terephthalate (0.2 mole) and 27.3 parts of ethylene glycol (0.44 mole) are placed in a 25 millimeter inside diameter glass polymerization tube, and 3.0 mg. of titanocene diacetate ($5.10^{-5}$ mole/mole of dimethyl terephthalate) are added. The reactants are heated for 4 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 millimeter of mercury, while the reaction mixture is stirred under dry nitrogen. After only 2 hours at 282° C., vacuum is released and polyethylene terephthalate polyester is obtained having an inherent viscosity $\eta_{inh}$ (c.=0.5)=0.68. The polyester is clear, has a light color number 5, and melts at 365° C., which indicates a very low diethylene glycol content.

EXAMPLE 9

38.8 parts of dimethyl terephthalate (0.2 mole) and 27.3 parts of ethylene glycol (0.44 mole) are placed in a 25 millimeter inside diameter glass polymerization tube, and 0.6 mg. titanocene diacetate ($1.10^{-5}$ mole/mole of dimethyl terephthalate) together with 1.7 mg. of zinc di(monomethyl terephthalate) ($2.10^{-5}$ mole/mole of dimethyl terephthalate) are added. The reactants are heated for 4 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 millimeter of mercury, while the reaction mixture is stirred under dry nitrogen. After 4 hours at 282° C., vacuum is released and polyethylene terephthalate polyester is obtained having an inherent viscosity $\eta_{inh}$ (c.=0.5)=0.70. The polyester is clear, has a light color number 6, and melts at 266.5° C., which indicates a very low diethylene glycol content.

EXAMPLE 10

38.8 parts of dimethyl terephthalate (0.2 mole) and 27.3 parts of ethylene glycol (0.44 mole) are placed in a 25 millimeter inside diameter glass polymerization tube, and 0.6 mg. of titanocene diacetate ($1.10^{-5}$ mole/mole of dimethyl terephthalate) together with 1.7 mg. of zinc di(monomethyl terephthalate) ($2.10^{-5}$ mole/mole of dimethyl terephthalate) are added. The reactants are heated for 4 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. Then 2.6 mg. of triphenyl phosphate ($2.10^{-5}$ mole/mole of dimethyl terephthalate) are added as stabilizer. The pressure is reduced to 0.1 to 0.3 millimeter of mercury, while the reaction mixture is stirred under dry nitrogen. After 4 hours at 282° C., vacuum is released and polyethylene terephthalate polyester is obtained having an inherent viscosity $\eta_{inh}$ (c.=0.5)=0.74. The polyester is clear, has a light color number of 6, and melts at 265° C., which indicates a very low diethylene glycol content.

In the above examples, the titanium compound can be replaced by other compounds including titanocene difluoride, titanocene dibromide, titanocene diiodide, titanocene hydroxybromide, titanocene di(chloroacetate), titanocene di(dichloroacetate), titanocene di(trichloroacetate), titanocene di(hydroxyacetate), titanocene di(mercaptoacetate), dibutoxytitanocene, cyclopentadienyl titanium trichloride, cyclopentadienyl dibutoxytitanium chloride, cyclopentadienyl dibutoxytitanium bromide, cyclopentadienyl dibutoxytitanium trichloroacetate, indenyl dibutoxytitanium bromide, indenyl tributoxytitanium, di-indenyltitanium dichloride, di-indenyltitanium trichloroacetate, α-naphthyl tributoxytitanium, p-tolyl tributoxytitanium, p-anisyl tributoxytitanium, diphenyl dibutoxy titanium, isopropyltributoxy titanium, ethyl titanium trichloride, diethyl titanium dichloride, and dimethyl titanium dichloride.

What we claim is:

1. In a process for the manufacture of highly polymeric film forming polyesters in which (I) a glycol is reacted with a compound selected from the group consisting of an aromatic dicarboxylic acid and an ester-forming derivative thereof, and (II) the resulting glycol dicarboxylate is condensed to form the polyester, the improvement comprising the use of a catalytic amount, at least during the polycondensation step, of a titanium catalyst soluble in the reaction mixture and possessing the formula $TiR_nX_{4-n}$, wherein R is selected from the group consisting of an alkyl group having from 1 to 7 carbon atoms, phenyl, naphthyl, tolyl and anisyl, cyclopentadienyl, and indenyl; X is selected from the group consisting of halogen, lower-alkoxy, and an acetate group; and $n$ is 1, 2 or 3.

2. A process according to claim 1 in which the glycol is ethylene glycol.

3. A process according to claim 2 in which the aromatic dicarboxylic acid is terephthalic acid.

4. A process according to claim 3 in which ester-interchange occurs between ethylene glycol and dimethyl-terephthalate to form bis(2-hydroxyethyl) terephthalate.

5. A process according to claim 1 in which the organometallic titanium compound is titanocenedichloride.

6. The process according to claim 1 in which the organometallic titanium compound is titanocenediacetate.

7. A process according to claim 1 in which the organometallic titanium compound is phenyl-tri(iso-propoxy)-titanium.

8. A process according to claim 1 in which the titanium catalyst is present in proportions of from about $1.10^{-5}$ to $2.10^{-4}$ moles per mole of the dicarboxylic acid or ester-forming derivative thereof employed in forming the glycol dicarboxylate.

9. In a process for the manufacture of film forming polyesters in which (I) ethylene glycol is reacted with terephthalic acid or dimethyl terephthalate and (II) the resulting ethylene glycol terephthalate is condensed to form the polyester, the improvement comprising the use of a catalytic amount during the polycondensation step of a catalyst which is a dicyclopentadienyl titanium dihalide having the formula $TiR_2X_2$ wherein R is cyclopentadienyl and X is halogen.

References Cited
UNITED STATES PATENTS

| | | | |
|---|---|---|---|
| 2,727,881 | 12/1955 | Caldwell et al. | 260—75 |
| 2,729,619 | 1/1956 | Sullivan | 260—75 |
| 3,047,515 | 7/1962 | Piirma | 260—75 |
| 3,080,305 | 3/1963 | Gorisch | 260—429.5 X |
| 3,326,965 | 6/1967 | Schultheis | 260—475 |

MELVIN GOLDSTEIN, Primary Examiner